United States Patent Office 2,712,554
Patented July 5, 1955

2,712,554

OXIDATION OF HALOGENATED OLEFINIC COMPOUNDS

William T. Miller, Ithaca, N. Y.

No Drawing. Application December 11, 1953,
Serial No. 397,779

15 Claims. (Cl. 260—544)

This invention relates to the oxidation of halogenated olefinic compounds. In one aspect the invention relates to the oxidation of halogenated olefinic compounds in the presence of an activator to produce oxygen containing products. This application is a continuation-in-part of my prior and copending application Serial No. 182,890, filed September 1, 1950, now abandoned, which is a division of application Serial No. 664,966, filed April 25, 1946, now abandoned.

Oxidation of organic compounds is not new in the art. In conventional oxidation processes actinic light or relatively high temperatures are employed to initiate the oxidation reaction which normally will not start unless activated. The use of actinic light or high temperatures is unnecessary in the presence of the activator of this invention for the oxidation of organic compounds of the type hereinafter defined.

An object of this invention is to provide a method for reacting halogen substituted olefinic compounds with oxygen.

Another object is to provide an improved process for preparing halogenated organic compounds containing the —(CO)— group.

Still a further object is to provide a process for preparing halogenated acyl halides.

Still another object is to provide an improved process for preparing halogenated acetyl halides.

Yet another object is to provide an improved process for preparing halogenated ketones.

Yet a further object is to provide a process in which the oxidation of organic compounds may be carried out in a cheaper and more facile manner than at present practiced.

Various other objects and advantages will become apparent to those skilled in the art from the accompanying description and disclosure.

In accordance with the present invention a halogen substituted olefinic compound is oxidized with free oxygen in the presence of added fluorine to produce oxygenated products. The olefinic organic compounds which are oxygenated with free oxygen employing free fluorine as an activator are the olefinic hydrocarbons substituted only with gaseous halogen containing no more than one unsubstituted hydrogen atom per carbon atom and containing a chlorine atom attached to an olefinically bonded carbon atom. The olefinic hydrocarbons which are oxygenated in accordance with this invention with free fluorine as an activator contain less than 25, preferably less than 14, carbon atoms per molecule and preferably contain no more than one hydrogen atom for every three carbon atoms, particularly in long molecules. It is also preferred that the carbon atoms of the double bond be completely substituted with gaseous halogen.

It has been found that the elemental fluorine which is employed as an activator has the property of causing the formation of free radicals when brought into contact with the olefinic compounds of the above type. These free radicals are formed by the presence of elemental fluorine without the necessity of the use of actinic light or without the necessity of the use of as high a temperature as would be necessary with the use of other halogens as activators, such as chlorine without actinic light, for the same olefinic compound to be oxidized. The free radicals so produced are highly reactive with oxygen. The action of fluorine in this respect is particularly valuable in providing a method for reacting halogenated olefins and oxygen of the above type to form halogenated compounds containing the —(CO)— group, such as carbonyl halides, halogen substituted acyl halides and halogenated ketones. The amount of fluorine may be as much as equimolar with respect to oxygen, but normally less than 10 mol per cent of fluorine as compared to oxygen is all that is required to activate the oxidation of the olefinic compound.

Both terminally double bonded and non-terminally double bonded halogen substituted olefinic hydrocarbons are oxidized in the presence of free or elemental fluorine as an activator. The terminally double bonded olefinic hydrocarbons of more than 2 carbon atoms per molecule are represented by the general formula

in which Y is chlorine, fluorine or hydrogen and R is a monovalent hydrocarbon radical substituted only with gaseous halogen and having not more than one unsubstituted hydrogen atom per carbon atom and preferably having less than 12 carbon atoms. Therefore, aside from the end or terminal group of the radical (R) which will contain an additional gaseous halogen, the hydrocarbon radical may be made up of any variation of the following groups:

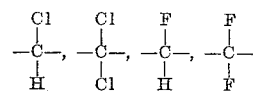

and

In the case of a diolefin or an olefin containing more than one double bond, the groupings will be the same, except adjacent the additional double bond each carbon atom will have one less substituent. Preferably, the hydrocarbon radical (R) of the above formula is a perfluoro or perfluorochloro hydrocarbon radical.

In the case of the non-terminally double bonded olefinic hydrocarbons, the acylic members of this group are represented by the formula

in which formula Y and R have the same definition set forth with regard to the terminally bonded olefinic compounds. Each R may be the same or different and preferably containing no more than 6 carbon atoms.

The alicyclic non-terminally double bonded olefinic hydrocarbons are represented by the formula

in which formula Y is the same as previously defined and R' is the same as R except that it is a divalent radical, that is, it does not contain a terminal or end group containing an additional gaseous halogen since the additional gaseous halogen is replaced by a bond between the radical and the carbon atom of the above formula. R' preferably contains no more than 12 carbon atoms and is also preferably a perfluoro or perfluorochloro hydrocarbon radical.

The formula for representing the ethylenic compounds which can be oxidized in accordance with this invention is $$X\underset{Y}{\overset{Y}{C}}=\underset{Cl}{C}$$

in which Y has been previously defined and X is a gaseous halogen, i. e., chlorine or fluorine.

In general, the perhalogenated olefins are preferred as reactants in accordance with this invention.

The reaction according to the invention comprises bringing together in olefin of the type described, oxygen and elemental fluorine. The quantity of fluorine required to form the free radicals is much smaller than the amount that would be normally used as a fluorinating agent. The quantity of fluorine actually used in a given reaction is preferably small for reasons of economy, although larger qauntities can be used. Where the reaction is performed under conditions promoting the formation of fluorinated products, the quantity of fluorine employed should be proportionally greater. Preferably, where oxidation only is desired the fluorine is about 0.01 to about 1 mol per cent on the basis of the oxygen reactant. Halogen trifluoride, such as chlorine trifluoride, may be used to supply the fluorine activation without departing from the scope of this invention. The reaction can be performed in the liquid phase or in the vapor phase if the reactants are sufficiently volatile. A wide range of temperatures can be used although temperature has some effect on the type and distribution of products.

In the specific case of the reaction of halogen-substituted ethylenes and oxygen, vapor phase reactions have been satisfactorily performed at temperatures as high as 250° C. and liquid phase reactions as low as —15° C., the preferred range being between about —10° C. and about 150° C. These temperatures are not critical and the range may be extended on the upper side to a value limited by the decomposition temperature of the olefin and the dissipation of the heat of reaction and on the lower side by the freezing point of the reaction mixture. The reaction of the substituted olefin containing chlorine and oxygen occurs readily without the use of radiant energy or elevated temperature which are the conventionally required conditions to accomplish this reaction.

To facilitate an understanding of the reaction and the part played by fluorine the following mechanism of reaction has been postulated in the sepcific case of reaction between tetrachloroethylene and oxygen, it being understood that the invention does not depend on the exact reactions indicated.

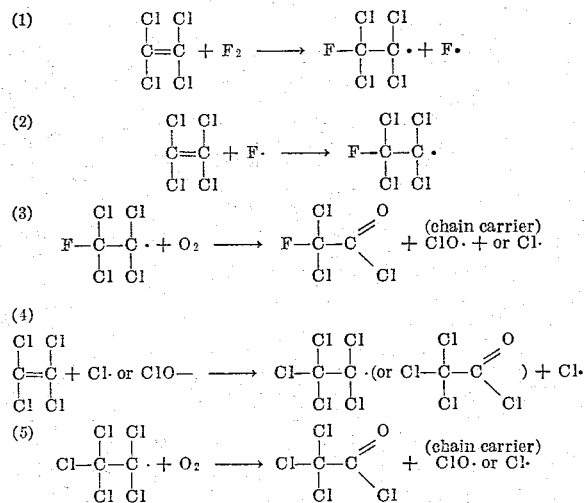

Particularly important in the above-postulated equations is the propagation of the reaction by a chain mechanism. Molecular fluorine reacts to form two free radicals, CFCl$_2$CCl$_2$· and F·. The fluorine radical reacts largely with another molecule of the tetrachloroethylene to form a further CFCl$_2$CCl$_2$· radical. The CFCl$_2$CCl$_2$· radical reacts with molecular oxygen to form an acid chloride and a chain carrier as ClO· or Cl·, which reinitiates the oxidation cycle. The chain mechanism results in a rapid, high-yield reaction.

In view of this type of reaction mechanism, the most favorable conditions for this process are determined primarily by the nature of the reactant materials. Since fluorine is a very highly reactive substance it is preferred to employ only such amounts as are required to initiate and maintain the chain reaction at a desired rate. Oxygen, on the other hand, is preferably employed in amounts in substantial excess over that required for the reaction. Under certain conditions, for example, when it is desirable to employ a relatively high proportion of fluorine in the gas mixture or to operate at relatively high temperatures where the reactivity of fluorine is exceptionally high, it may be desirable to dilute the fluorine-oxygen mixture with an inert component, such as nitrogen, in order to obtain a more controllable reaction. Alternatively, carefully dried air or even certain waste gases containing oxygen and/or fluorine may be economically employed in this process. Furthermore, due to the fact that fluorine is so highly reactive and the reaction between fluorine and carbon compounds is highly exothermic, in order to obtain the described results and maintain a desired rate of reaction it is necessary to provide adequate means for dissipating the heat of reaction.

The following examples are directed to provide evidence of the utility of the described process and to give an indication of the variety of conditions under which it may be carried out. However, it will be understood that while these examples embody the essential features of the process, the process of this invention is not necessarily limited thereto.

EXAMPLE 1

Approximately equal volumes of oxygen and fluorine were bled at a rate of about 2 liters per hour respectively into a stream of nitrogen flowing at a rate of about 22 liters per hour which was saturated with tetrachloroethylene at 100° C. This mixture was passed under slightly more than atmospheric pressure through a cylindrical reaction vessel which was packed with copper gauze and kept at 100° C. by a suitably thermostated jacket. The fluorination was continued for 15 hours during which time the nitrogen stream took up some 234 grams of tetrachloroethylene and some 195 grams of product were recovered by a number of condensers connected in series after the reactor. The uncondensed gases, which gave a positive test for both oxygen and chlorine, were discarded to an exhaust system. The combined product was a clear, slightly yellow liquid which fumed in moist air and had a sharp odor resembling that of phosgene. This liquid distilled over a wide temperature range of give the following product distribution.

*Table 1*

| Fraction | Temperature, ° C. | Weigh (gm.) |
| --- | --- | --- |
| 1 | 33–35 | 9.4 |
| 2 | 35–44 | 4.2 |
| 3 | 44–71 | 5.9 |
| 4 | 71–73 | 24.5 |
| 5 | 73–118 | 11.8 |
| 6 | 118–121 | 46.6 |
| 7 | 121–136 | 11.5 |
| 8 | 136–138 | 22.5 |
| 9 | 138°/740 mm.–148°/20 mm. | 34.9 |

Phosgene, difluorochloroacetylchloride and fluorodichloroacetylchloride were identified among the reaction products, which were quite distinct from the variety of addition products obtained by the action of fluorine alone. However, some normal fluorine reaction products, such as fluoropentachloroethane, were also isolated from the reaction mixture. Furthermore, subsequent investigations proved that the fraction No. 6 boiling between 118° C.–121° C. actually contains an appreciable amount of trichloroacetylchloride (B. P. 120° C.) instead of being composed largely of the starting material tetrachloroethylene (B. P. 118° C.) as was assumed in this experiment. The results of this experiment indicated that in the presence of oxygen the direct addition of fluorine on the double bond may be inhibited. The subsequent examples cited more tests run to prove the mechanism of the reaction under a variety of conditions and the function of fluorine in that mechanism.

EXAMPLE 2

Fluorine, generated by the electrolysis of molten fluoride salts at a rate corresponding to the consumption of about 4 amps. of current, was mixed with a stream of dry air in proportions of about 1:4 respectively and under pressures slightly less than atmospheric this mixture was passed in contact with 443 grams of liquid tetrachloroethylene. The liquid was constantly agitated to insure intimate contact between the gas and liquid phases and was maintained at 0° C. by a suitably thermostated bath. In marked contrast to the type of product obtained by the action of elementary fluorine alone, the principal products of this reaction were oxidized compounds. However, small amounts of normal reaction products were also isolated from the reaction mixture. During the initial phase of the reaction a small amount of a condensate later identified as phosgene was collected in a Dry Ice trap attached to the exhaust system. After 7 hours of treatment the reaction mixture was a light green yellow color and smelled of phosgene. Chlorine and phosgene were identified among the first products boiled from the reaction mixture when it was separated by fractional distillation. The mixture boiled over a wide range of temperatures and gave the distribution shown below in Table 2.

Table 2

| Fraction | Temperature, ° C. | Weight (gm.) |
|---|---|---|
| 1 | 15.5–65 | 17.9 |
| 2 | 70–85 | 40.8 |
| 3 | 85–118.5 | 63.2 |
| 4 | 118.5–120.5 | 143.7 |
| 5 | 120.5/740 mm.–48/55 mm. | 83.3 |
| 6 | 48/55 mm.–90/55 mm. | 20.8 |
| 7 | 90/55 mm.–139/15 mm. | 19.0 |
| 8 | 139/15 mm.–140/15 mm. | 31.5 |
| 9 | residue | 12.7 |

Fractions 2, 3 and 4 boiling between 70° C. and 120.5° C. were redistilled to separate their components more effectively. Dichlorofluoroacetanilide was prepared by reacting the fraction boiling between 70° C. and 72.5° C. with aniline, thus indicating the presence of dichlorofluoroacetylchloride. The fraction of this redistillation boiling above 110° C. (54 grams) was combined with the original fractions 5 and 6 and the whole was reacted with aniline in order to identify and determine the amount of trichloroacetylchloride present. This technique served as a convenient method of separating the acid chloride from any tetrachloroethylene, the starting material, which has practically the same boiling point. 99.3 grams of trichloroacetanilide were isolated from these fractions thus indicating the presence of an appreciable amount of trichloroacetylchloride. Other compounds positively identified included tetrachlorodifluoroethane, pentachlorofluoroethane, hexachloroethane and difluorooctachlorobutane, all of which are normal reaction products and were present in relatively small amounts.

EXAMPLE 3

491 grams (2.96 moles) of vigorously stirred tetrachloroethylene was treated with 0.486 mole of fluorine and 2.3 moles of oxygen added at the rate of 0.0845 mole and 0.4 mole per hour respectively. The reaction was carried out at −15° C. for 5 hours and 45 minutes. 501.5 grams of product was obtained from the reaction vessel and 1.5 cc. was collected in a Dry Ice trap attached to the waste gas line. The product was separated into its various components by fractional distillation and the nature as well as the amount of the different substances present in each fraction was established by standard analytical procedures. A summary of the breakdown of the product obtained in this run is given below in Table 3.

Table 3

| Compounds | Weight (gm.) | Moles | Moles/Mole of $C_2Cl_4$ |
|---|---|---|---|
| $COCl_2$ | 18.5 | 0.187 | 0.0766 |
| $CCl_2FCOCl$ | 28.6 | 0.176 | 0.142 |
| $CFCl_2CFCl_2$ | 5.4 | 0.0265 | 0.0217 |
| $CCl_3COCl$ | 95.1 | 0.523 | 0.429 |
| $C_2Cl_6$ | 18.4 | 0.0776 | 0.0636 |
| dimer | 7.9 | | |

EXAMPLE 4

578 grams (4.4 moles) of vigorously stirred trichloroethylene was treated at 0° C. with a mixture of oxygen and fluorine added at a rate of 0.7 mole and 0.093 mole per hour respectively. The reaction was unusually vigorous and required considerable cooling to maintain the temperature constant. 586.8 grams of product were obtained from the reaction vessel and 31.3 grams from the Dry Ice trap. The product was treated in a manner similar to that described for the previous example. Table 4 which follows summarizes the results of this run.

Table 4

| Compounds | Weight (gm.) | Moles | Moles/Mole of $C_2HCl_3$ |
|---|---|---|---|
| $COCl_2$ | 53.5 | 0.541 | 0.076 |
| $CHCl_2COF$ | 22.1 | 0.17 | 0.048 |
| $CHCl_2COCl$ | 368.0 | 2.50 | 0.70 |
| $CHCl_2CCl_3$ | 23.0 | 0.1 | 0.028 |
| $C_4H_2Cl_6$ | 8.0 | 0.03 | 0.017 |

EXAMPLE 5

Trifluorochloroethylene vapors carried by a stream of oxygen were mixed with gaseous fluorine in a heated reaction chamber to investigate the mechanism of fluorine sensitized oxidation of fluorochloroolefin compounds. The trifluorochloroethylene was bled into the oxygen stream, which was itself flowing at a rate of about 0.65 mole per hour, at a rate calculated to add approximately 0.4 mole of the olefin per hour. Fluorine was introduced into the reaction vessel at a rate of about 0.04 mole per hour. The reaction chamber consisted of a cylindrical vessel which was maintained at a temperature of about 25° C. Thus in the course of about 4 hours some 170 grams (1.46 moles) of trifluorochloroethylene vapor was treated with 5.4 grams (.14 mole of fluorine) with a substantial excess of oxygen present.

The product was collected in a series of three traps maintained at room, Dry Ice, and liquid air temperatures respectively arranged in series after the reaction chamber. The reaction product was carefully distilled and caused to react with aniline to separate the various fractions into their respective components and to identify as well as isolate the various compounds formed. A breakdown of the product is given below in Table 5.

*Table 5*

| Compounds | Weight (gm.) | Moles |
|---|---|---|
| $COF_2$ | 26.2 | 0.396 |
| $CF_3COF$ | 5.34 | 0.046 |
| $ClCOF$ | 25.9 | 0.257 |
| $CF_2ClCOF$ | 60.66 | 0.572 |
| $FCOCOF$ | 1.43 | 0.015 |
| $CF_2:CFCl$ | 39.9 | 0.346 |
| $C_4F_6Cl_2$ | 3.0 | 0.015 |

It will be noted that under these conditions the high reactivity of fluorine is evidenced by the relatively large amounts of more completely fluorinated products and the presence of acid fluorides.

EXAMPLE 6

173 grams (1.30 moles) of well stirred difluorodichloroethylene B. P. 20–21° C. was treated at 0° C. with 0.135 mole fluorine and 1.22 moles oxygen during 2.45 hours. 1.41 grams of liquid material was recovered from this reaction which contained halogenated and oxidized reaction products and which boiled principally from −33° C. to +150° C. Reaction of the lowest boiling fraction with aniline yielded diphenyl urea indicating the presence of phosgene and/or fluoro phosgenes and reaction of the fraction boiling from 69–95° C. (but largely around 75° C.) with ammonia yielded dichlorofluoroacetamide ($CFCl_2CONH_2$) of M. P. 129–131° C. Thus

type products containing one and two carbons were shown to be present in the reaction product obtained from difluorodichloroethylene. In the above formula R is a monovalent hydrocarbon radical and X is a gaseous halogen as previously defined.

Examples No. 3 and No. 4, particularly, illustrate chlorination as well as oxidation. In these reactions fluorine replaced part of the chlorine of the starting compound and the free chlorine reacted with another portion of the starting compound and with some of the intermediate compounds to form chlorinated oxygen-free derivatives in addition to acting as a chain carrier. Thus in Example No. 3, $C_2Cl_6$ was found in the reaction mixture, resulting from chlorination of $C_2Cl_4$. Also in Example No. 4, $CHCl_2CCl_3$ was found, resulting from the chlorination of $CHCl=CCl_2$. A mixture of chlorine and oxygen can be used to increase the yield of highly chlorinated products.

The invention is not limited to the two-carbon compounds disclosed in the examples but is broadly applicable to halogen substituted olefins having up to 24 carbon atoms per molecule.

Reactions with other olefins of the type defined are carried out in the same manner as illustrated in the examples with the halogen substituted ethylenes. The oxidation of such other compounds is shown below where the general reaction is shown first for a general class of compounds and specific reactions then follow. In each case, the principal products which may be obtained are indicated. Their relative amounts may be controlled by changing the reaction conditions—for example, higher temperatures result in the formation of relatively more cleavage products, that is, products formed with cleavage of carbon carbon bonds. In Formulas 6, 10, 20, 24 and 30 below, X is chlorine or fluorine, Y is chlorine, fluorine or hydrogen, R is a monovalent hydrocarbon radical and R' is a divalent hydrocarbon radical as previously defined.

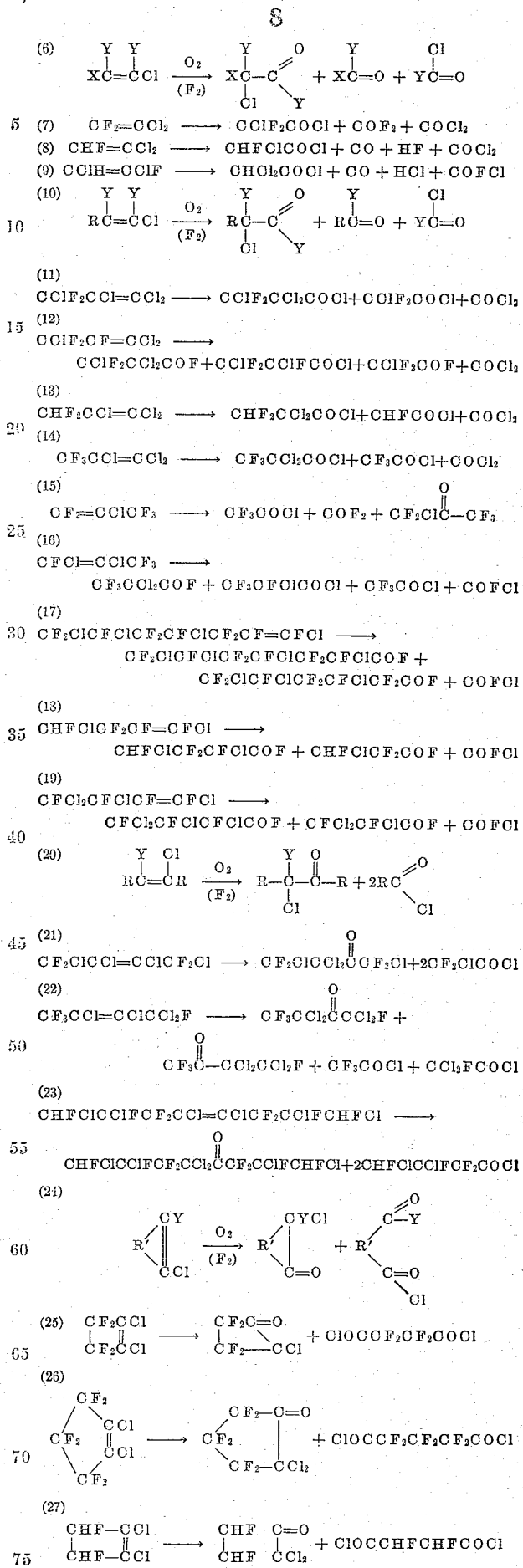

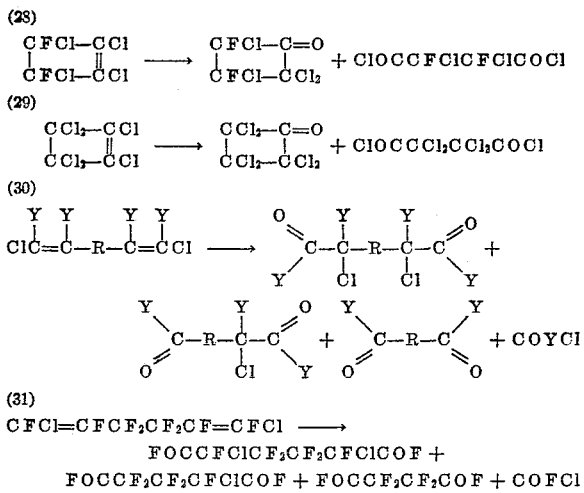

(31)
$CFCl=CFCF_2CF_2CF=CFCl \longrightarrow$ $FOCCFClCF_2CF_2CFClCOF +$ $FOCCF_2CFClCOF + FOCCF_2CF_2COF + COFCl$ The olefinic starting compounds to be oxidized can be prepared by various methods. One method is the production of the corresponding chlorinated compound by conventional methods and the substitution of the desired amount of fluorine for chlorine followed by dechlorination of the fluorochloro compound in the presence of zinc at temperatures of about 100° C. Another method which is particularly useful for the production of the compounds having more than two carbon atoms per molecule, such as the propenes, butenes and cyclobutanes, is the pyrolysis of trifluorochloroethylene in a hot tube at temperatures between about 500° C. and about 900° C. for a period of time between about ½ and about 10 seconds. In the pyrolysis method lower temperatures within the above range and shorter contact time are preferred for the production of alicyclic compounds, while higher temperatures and longer contact time within the above range are preferred for the production of acylic compounds. In the pyrolysis method the acyclic olefinic compounds are produced directly and the necessity of dechlorination is obviated. The alicyclic compounds may be dechlorinated to the olefins. If further unsaturation is desired, the olefinic compounds thus produced may be dechlorinated still further as previously described.

The invention provides a valuable process for preparing a series of organic compounds. The commercial methods for reacting halogen-substituted olefins and oxygen or chlorine have heretofore required difficult operating conditions and complicated equipment. The conventional reaction conditions rely on activation of the reactants by high temperatures and/or light. The use of light has been attended with great operating difficulties because of the limited zone of activity around the light source, coating of the light source with reaction products, difficulty of operating with colored mixtures, etc. The high temperature reactions are unsuitable for many compounds because of excessive decomposition. The fluorine-promoted reactions of this invention are rapid, permit great flexibility in operating temperatures and other conditions, and require only simple types of equipment. Control of the promoter concentration by gas feed is simple and effective and homogeneous reactions may be obtained.

Since many embodiments might be made of the present invention and since many changes might be made in the embodiment described, it is to be understood that the foregoing description is to be interpreted as illustrative and not in a limiting sense.

Having described my invention, I claim:

1. The process for preparing a halogenated organic compound containing the —(CO)— group which comprises reacting ethylene substituted only with gaseous halogen and containing at least one chlorine atom and not more than one hydrogen atom; and oxygen in the presence of elemental fluorine; and separating a halogenated organic compound containing the —(CO)— group from the reaction mixture.

2. The process for preparing a halogenated organic compound containing the —(CO)— group which comprises reacting tetrachloroethylene and oxygen in the presence of elemental fluorine, and separating a halogenated organic compound containing the —(CO)— group from the reaction mixture.

3. The process for preparing a halogenated organic compound containing the —(CO)— group which comprises reacting trichloroethylene and oxygen in the presence of elemental fluorine, and separating a halogenated organic compound containing the —(CO)— group from the reaction mixture.

4. The process for preparing a halogenated organic compound containing the —(CO)— group which comprises reacting trifluorochloroethylene and oxygen in the presence of elemental fluorine, and separating a halogenated organic compound containing the —(CO)— group from the reaction mixture.

5. The process for preparing a halogenated organic compound containing the —(CO)— group which comprises reacting difluorodichloroethylene and oxygen in the presence of elemental fluorine, and separating a halogenated organic compound containing the —(CO)— group from the reaction mixture.

6. A process for oxidation of halogenated organic compound which comprises reacting an olefinic hydrocarbon having less than 25 carbon atoms substituted only with gaseous halogen containing no more than one unsubstituted hydrogen atom per carbon atom and containing a chlorine atom attached to an olefinically bonded carbon atom with oxygen in the presence of fluorine to produce an oxygenated product containing the —(CO)— group.

7. The process of claim 6 in which said halogenated olefinic hydrocarbon is terminally double bonded.

8. The process of claim 7 in which said halogenated olefinic hydrocarbon is a monoolefin.

9. The process of claim 7 in which said halogenated olefinic hydrocarbon is a diolefin.

10. The process of claim 6 in which said halogenated olefinic hydrocarbon is non-terminally double bonded.

11. The process of claim 10 in which said halogenated olefinic hydrocarbon is acyclic.

12. The process of claim 10 in which said halogenated olefinic hydrocarbon is alicyclic.

13. The process of claim 6 wherein the reaction is performed in the vapor phase.

14. The process of claim 6 wherein the reaction is performed with the compound with the formula RCX=CXY in the liquid phase, in which formula R is a monovalent hydrocarbon radical having less than 12 carbon atoms, Y is an element selected from the group consisting of chlorine, fluorine and hydrogen and X is a gaseous halogen.

15. The process of claim 6 wherein the reaction is performed in the presence of an inert diluent gas.

No references cited.